United States Patent [19]

Creekmore et al.

[11] 4,057,672

[45] Nov. 8, 1977

[54] COMPOUNDED POLYVINYL CHLORIDE

[75] Inventors: Mark D. Creekmore, Akron, Ohio; Henry F. Panning, Abington, Pa.

[73] Assignee: The Goodyear Tire & Rubber Company, Akron, Ohio

[21] Appl. No.: 532,426

[22] Filed: Dec. 16, 1974

Related U.S. Application Data

[63] Continuation-in-part of Ser. No. 364,796, May 29, 1973, abandoned.

[51] Int. Cl.$^2$ ............................................... B32B 27/30
[52] U.S. Cl. ............................ 428/220; 260/18 EP; 260/23 XA; 260/30.4 R; 260/30.6 R; 260/31.6; 260/31.8 R
[58] Field of Search .............. 260/23 XA, 23.7 H, 42, 260/49, 31.8 R; 428/22, 220

[56] References Cited

U.S. PATENT DOCUMENTS

| | | | |
|---|---|---|---|
| 3,451,960 | 6/1969 | Schmidt | 260/29.6 |
| 3,479,308 | 11/1969 | Gattenby | 260/23 XA |
| 3,567,669 | 3/1971 | Georgiana | 260/23 XA |
| 3,882,061 | 5/1975 | Bontinck | 260/23 XA |
| 3,931,076 | 1/1976 | Rubin | 260/23 XA |

*Primary Examiner*—Lewis T. Jacobs
*Assistant Examiner*—William E. Parker
*Attorney, Agent, or Firm*—F. W. Brunner; H. C. Young, Jr.

[57] ABSTRACT

A compounded polyvinyl chloride and a method for its preparation which comprises polyvinyl chloride, selected plasticizer, silica pigment, selected heat stabilizer, selected chelator, selected surfactant and selected slip-antiblock agent. The compounded polyvinyl chloride uniquely has, as a film, anti-moisture fogging and oxygen transmissive properties suitable for packaging meat, yet can be used in high speed packaging machines.

11 Claims, No Drawings

COMPOUNDED POLYVINYL CHLORIDE

This application is a continuation-in-part of our application Ser. No. 364,796, filed May 29, 1973, now abandoned.

This invention relates to a compounded polyvinyl chloride. More particularly, the invention relates to a compounded polyvinyl chloride film which can be suitably used in an automated packaging process.

Polyvinyl chloride films have been widely used for packaging various materials including meat products. Such films when properly compounded with additional materials can provide meat packaging films with sufficient film surface moisture antifogging properties that their internal surfaces do not become fogged at normal refrigeration temperatures and also a sufficient oxygen permeability so the hemoglobin of meat products can oxidize to allow the meat to maintain its red color. However, inherent difficulties have occurred when it has been desired to package meat in such compounded polyvinyl chloride films on a mass production basis utilizing high speed machines. Typically the reject rate of packages and machine down time during high speed machine packaging has been excessively large due to the high frequency of torn film or jammed machines.

It has been discovered that the cause of the torn film or jammed machine in high speed packaging operation is apparently due primarily to undesirable film surface phenomena causing it to excessively adhere to portions of the machinery. Although such film surface phenomena are not thoroughly understood, it is believed to potentially involve friction forces such as drag and adhesion as well as static charge and attractional forces.

Therefore, it is an object of this invention to provide a compounded polyvinyl chloride suitable for use as a packaging film having acceptable film surface moisture antifogging and oxygen permeability yet which can be utilized in a high speed machine packaging operation.

In accordance with this invention, it has been discovered that an improved compounded polyvinyl chloride comprises 100 parts by weight of polyvinyl chloride resin, from about 20 to about 45, preferably about 21 to about 44, parts by weight of at least one plasticizer selected from at least one of di(2-ethylhexyl)adipate, expoxidized soyabean oil, epoxidized linseed oil, acetyltributylcitrate, butylbenzylphthalate, dibutyl sebacate, butylstearate, acetyl triethyl citrate, p-tert-butylphenyl, salicylate, butylphthalyl butyl glycolate, di-(2-ethylhexyl)phthalate, diethyl phthalate, diisobutyl adipate, diisooctyl phthalate, diphenyl-2-ethylhexyl phosphate, ethylphthalyl ethyl glycolate, glycerol monooleate, monoisopropyl citrate, mono-, di- and tristearyl citrate, triacetin(glycerol triacetate), triethyl citrate, 3-(2xenoyl)-1,2-epoxypropane, 1,3-butylene glycol adipic acid polyester of about 1700 to about 2200 molecular weight terminated with at least one organic acid selected from myristic, palmitic and stearic acids, dicyclohexyl phthalate, di(2-ethylhexyl)-azelate, di-n-hexyl azelate, dihexyl phthalate, diphenyl phthalate, epoxidized butyl esters of linseed oil fatty acids, diisononyl adipate and diisononyl phthalate, from about 0.1 to about 2.5, preferably about 0.2 to about 2.0, parts by weight of a pigment having an average particle size in the range of 1 to about 10, including about 2 to about 10, microns selected from pigments comprised of about 50 to about 100, preferably about 95 to about 100, weight percent silica ($SiO_2$), and correspondingly about 0 to about 50, preferably about 0 to about 5, weight percent other oxides selected from aluminum, magnesium, calcium, iron, potassium and sodium, from about 0.05 to about 0.25, preferably about 0.1 to about 0.2, parts by weight of a heat stabilizer comprising zinc stearate and calcium stearate in a zinc to calcium weight ratio of about 1:1 to about 3.9:1, preferably about 3:1 to about 3.7:1, from about 0.25 to about 1.5, preferably about 0.4 to about 1.0, parts by weight of tris-nonylphenyl phosphite as a chelator, from about 2 to about 9, preferably about 3 to about 8, parts by weight of at least one surfactant selected from: polyoxyethylene(20)sorbitan monooleate, the mono and diglycerides of fat-forming fatty acids, a nonylphenoxy polyoxyethylene ethanol containing 4 to 5 moles of ethoxylate, glycerol monooleate, sorbitan monooleate, polyoxyethylene(9)monooleate, $\alpha$-alkyl-, $\alpha$-alkenyl and $\alpha$-alkylaryl-omega-hydroxypoly(oxyethylene) comprised of at least one of $\alpha$-(2,4,6-triisobutylphenyl)-omega-hydroxypoly(oxyethylene), $\alpha$-(Z)-9-octadecenyl-omega-hydroxypoly(oxyethylene), and $\alpha$-alkyl($C_{16}$-$C_{18}$)-omega-hydroxypoly(oxyethylene), $\alpha$-alkyl-omega-hydroxypoly(oxyethylene) derived from ethylene oxide and $C_{11}$-$C_{15}$ straight chain secondary alcohols, n-alkylsulfonate where said alkyl group has 10–18 carbon atoms, $\alpha$-di-sec-butylphenyl-omega-hydroxypoly(oxyethylene) derived from ethylene oxide and di-sec-butylphenol, $\alpha$-dodecyl-omega-hydroxypoly(oxyethylene) mixture of dihydrogen phosphate and monohydrogen phosphate esters derived by esterification of the product of ethylene oxide and n-dodecyl alcohol, $\alpha$-(p-dodecylphenyl)-omega-hydroxypoly(oxyethylene) derived from ethylene oxide and dodecylphenol, $\alpha$-(p-nonylphenyl)-omega-hydroxypoly(oxyethylene) mixture of dihydrogen phosphate and monohydrogen phosphate esters derived from esterification of $\alpha$-(p-nonylphenyl)-omega-hydroxypoly(oxyethylene), $\alpha$-(p-nonylphenyl)-omega-hydroxypoly(oxyethylene) derived from condensation of nonylphenol and ethylene oxide, $\alpha$-(p-nonylphenyl)-omega-hydroxypoly(oxyethylene)sulfate, ammonium and sodium salts where said nonyl group is a propylene trimer isomer and said poly(oxyethylene) content averages about 4 moles, poly(oxypropylene) block polymer with poly(oxyethylene) having an average molecular weight of about 11,000 to about 18,000, polyoxyethylene(20)sorbitan monostearate, polyoxyethylene(20)sorbitan tristearate, polyoxyethylene(20)sorbitan monooleate, polyoxyethylene(20)sorbitan trioleate, sodium n-alkylbenzenesulfonate where said alkyl group contains an average of about 10 to about 16 carbon atoms, sorbitan monopalmitate, sorbitan monostearate, sorbitan trioleate, sorbitan tristearate, $\alpha$[p-(1,1,3,3-tetramethylbutyl)phenyl]-omega-hydroxypoly(oxyethylene) derived from ethylene oxide and p-(1,1,3,3-tetramethylbutyl)phenol, tetrasodium N-(1,2-dicarboxyethyl)-N-octadecyl-sulfosuccinamate, and $\alpha$-tridecyl-omega-hydroxypoly(oxyethylene) mixture of dihydrogen phosphate and monohydrogen phosphate esters derived from esterification of the product of ethylene oxide and tridecyl alcohol, and from about 0.1 to about 1, preferably about 0.15 to about 0.9, parts by weight of a slip-antiblock agent selected from at least one of the group consisting of ethylene-N,N'-bis oleamide, hydrofol glyceride, hydrogenated fish oil, calcium ricinoleate and fatty acid amides selected from amides with aliphatic hydrocarbon chains containing in the range of about 16 to 40, preferably 18 to 34, even numbered carbon atoms, said hydrocarbon chains being saturated or partly unsaturated with 1 to 2, preferably 1, carbon-to-carbon double bonds of unsaturation.

In the practice of this invention, particularly useful plasticizers are selected from at least one of di(2-ethylhexyl)adipate, epoxidized soyabean oil, epoxidized linseed oil, acetyltributylcitrate, butylbenzylphthalate, dibutyl sebacate and butylstearate. Particularly useful surfactants are selected from polyoxyethylene(20)sorbitan monooleate, the mono and diglycerides of fat-forming fatty acids, a nonylphenoxy polyoxyethylene ethanol containing 4 to 5 moles of ethoxylate, glycerol monooleate, sorbitan monooleate and polyoxyethylene(9)monooleate.

The compounded polyvinyl chloride film of this invention can be generally characterized when having a thickness of about 0.8 mils by an Elmendorf tear resistance in the range of about 100 to about 650 grams/mil according to ASTM No. D-1922-61T, a coefficient of friction (film against metal) of about 0.2 to about 2.0 according to ASTM No. D-1894-63, a water vapor transmission rate (WVTR) at 37.8° C and a humidity of about 90 percent in the range of about 15 to about 50g/100 in$^2$/24 hrs. according to ASTM No. E-96-66, Procedure E, and an oxygen transmission of about 350 to about 1200 cc/100 in $^2$/24 hrs/1 atm according to ASTM No. D-1434-63.

In the practice of this invention the compounded polyvinyl chloride is prepared by sequentially mixing with about 450 to about 600 parts by weight of an organic solvent (A) about 3 to about 40 parts by weight of a pigment masterbatch prepared by high shear mixing at a temperature in the range of about 135° C to about 190° C, 100 parts by weight of polyvinyl chloride resin with from about 10 to about 60 parts by weight of plasticizer, from about 2 to about 6 parts by weight of pigment, from about 1 to about 5 parts by weight of stabilizer and from about 0.5 to about 3.0 parts by weight of chelator, (B) 100 parts by weight of polyvinyl chloride resin and (C) about 2 to about 9 parts by weight of surfactant, about 0.1 to about 1.0 parts by weight of the slip agent, about 0.1 to about 1.4 parts by weight of chelator and about 18 to about 43 parts by weight of plasticizer. This mixture is blended at a temperature of about 25° C to about 150° C (depending somewhat on the boiling point of the solvent) but preferably in a range of about 25° C to about 65° C for about 6 to about 8 hours until it smooths out or dissolves which can easily be detected by apppropriate viscosity measurements.

This compounded polyvinyl chloride containing the solvent can then be cast as a liquid film onto a moving belt having a release coating thereon, such as modified polyvinyl alcohol, and passed beneath a stationary doctor blade positioned about 5 to 12 mils above the belt. The moving belt and film can pass through a hot air drying oven adjusted to a temperature of about 25° C to about 95° C for a period of about 1 to about 3 minutes to remove the solvent and yield the resulting compounded polyvinyl chloride film having a thickness of about 0.5 to about 4.5 mils. Other drying temperatures and time combinations can be used as desired.

In this practice of this invention it was discovered that a polyvinyl chloride film compounded in this manner provides a packaging film having a substantially reduced and practically nonexistant rejection rate due to tearing or jamming in a high speed machine, packaging operation.

In the practice of this invention, various organic solvents can be used for preparing the compounded polyvinyl chloride representative examples of which are tetrahydrofuran (THF), methyl ethyl ketone, methyl isobutyl ketone, cyclohexanone, dioxane and dimethyl formamide. Tetrahydrofuran is preferred.

Various polyvinyl chlorides can be used including those prepared by solution polymerization, suspension polymerization and bulk polymerization. They typically have a particle size range from about 75 to about 200 microns with an inherent viscosity in the range of about 1.05 to about 1.15 as determined in cyclohexanone according to ASTM No. D-1243-66. They can have an apparent density in the range of about 27 to about 35 pounds per cubic feet, a compact density in the range of about 33 to about 37 pounds per cubic feet and a specific gravity in the range of about 1.3 to about 1.5.

In the further practice of this invention, it is preferred that the polyvinyl chloride resin be compounded with a plasticizer selected from at least one of di(2-ethylhexyl)adipate and epoxidezed soyabean oil, a silica pigment having a silica content of at least about 98 weight percent; a stabilizer as a mixture of zinc stearate and calcium stearate; tris-nonylphenyl phosphite chelator; a surfactant mixture of polyoxyethylene(20) sorbitan monooleate, mono and diglycerides of fat-forming fatty acids, and a nonylphenoxy polyoxyethylene ethanol containing 4 to 5 moles of ethoxylate, and ethylene-N,N'-bis-oleamide as a slip-antiblocking agent.

The various epoxidized oils are oils to which oxygen has been added to some of their chemical points of unsaturation. The resulting structure has been called an oxirane oxygen. Typically, the epoxidized linseed and soyabean oils are characterized by containing about 4 to about 10, preferably about 7 to about 9.5, weight percent oxirane oxygen. Certainly, it is well known that the linseed and soyabean oils are comprised primarily of complex mixtures of saturated and mostly unsaturated triglycerides.

Various surfactants selected from mono and diglycerides of fat-forming fatty acids can be used. Representative of such fat-forming fatty acids are those having about 10 or 12 to about 20 carbon atoms such as lauric, palmitic, stearic, oleic, linolenic acids. If the preferable mixture of nonylphenoxy polyoxyethylene ethanol, polyoxyethylene(20)sorbitan monooleate and said glycerides of fat-forming fatty acids is used, particularly desirable results can be achieved if a maximum of about 3.5 parts by weight per 100 parts polyvinyl chloride of the total of said monooleate and said fatty acid is used with the remainder of the surfactant comprising said ethanol compound.

Ethylene-N,N'-oleamide is the preferred material for the slip-antiblock agent. However, of the various fatty acid amides for this purpose representative examples are $C_{18}$ saturated stearamide, $C_{18}$ unsaturated oleamide, $C_{40}$ saturated fatty acid amide, $C_{22}$ saturated behenamide and $C_{34}$ saturated fatty acid amide, $C_{22}$ unsaturated erucamide, $C_{16}$ unsaturated fatty acid amide, $C_{12}$ saturated lauramide and $C_{16}$ saturated palmitamide.

The practice of this invention is further illustrated by reference to the following examples which are intended to be representative rather than restrictive of the scope of the invention. Unless otherwise indicated, all parts and percentages are by weight.

EXAMPLE I

To a vessel was charged 600 parts of tetrahydrofuran and 26.39 parts of a masterbatch. The masterbatch was premixed by blending and fluxing the following ingredients shown in Table 1:

TABLE 1

| Compound | Parts |
| --- | --- |
| Polyvinyl chloride (solution polymerized) | 100 |
| Di(2-ethylhexyl)adipate and | 25 |
| epoxidized soyabean oil | 15 |
| Silica (99.5% SiO$_2$) | 5 |
| Zinc stearate and calcium stearate in a weight ratio of about 3:1 to 3.7:1 blended with an epoxidized soyabean oil in a 1:2 weight ratio | 3 |
| Tris-nonylphenyl phosphite | 1.5 |

To the mixture was then added 100 parts of solution polymerized polyvinyl chloride resin having an inherent viscosity of about 1.1 and a specific gravity of about 1.4. The mixture was blended under medium shear for about 1 to 2 hours at about 50° C. Then the rest of the ingredients were added in accordance with the recipe shown on Table 2:

TABLE 2

| Compound | Parts |
| --- | --- |
| Polyoxyethylene(20)sorbitan monooleate | 1.59 |
| Mono and diglycerides of fat-forming fatty acids | 2.80 |
| Nonylphenoxy polyoxyethylene ethanol as a mixture containing 4 to 5 moles of ethoxylate | 1.76 |
| Ethylene-N,N'-bis-oleamide | 0.24 |
| Tris-nonylphenyl phosphite | 0.5 |
| Di(2-ethylhexyl)adipate and epoxidized soyabean oil in weight ratio of 90:10 | 28.24 |

The resulting mixture was stirred at about 50° C for about 6 more hours until it had a smooth consistency indicating that all the ingredients had dissolved. The solution was then cast onto a moving belt having a polyvinyl alcohol release coating. The thickness of the cast solution was controlled by a stationary doctor blade with a bar setting of 8 mils above the moving belt. The film solution layer was then carried by the belt through a staged hot air drying oven having several sequential heating zones with oven temperatures progressing from about 50° C to about 80° C for a period of 50 seconds. The dried compounded polyvinyl chloride was cooled to about 25° C to yield a film having a thickness of about 0.8 mils and a solvent retention of less than about 5 percent.

The resulting film was submitted to testing where the following results were obtained as shown in Table 3:

TABLE 3

| Test | Result |
| --- | --- |
| Film gauge | .80 mil |
| Elmendorf tear | 500 g/mil |
| Coefficient of friction (film agains metal) | .71 – 1.01 |
| Moisture Antifogging rating | 7 – 9 on a 1 – 10 scale (10 best) |
| Water vapor permeability (WVTR) | 19g/100 in $^2$/ 24 hrs |
| Oxygen transmission | 400cc/100 in$^2$/ 24 hrs/ 1 atm |

Thus, the compounded polyvinyl chloride film of this invention, as more clearly demonstrated in Example I, uniquely possesses not only the required film moisture antifogging and oxygen transmission qualities for food packaging, but also now possesses the necessary tear resistant and slip properties for successful use in high speed automated machines for more economical packaging of food products.

While certain representative embodiments and details have been shown for the purpose of illustrating the invention, it will be apparent to those having skill in this art that various changes and modifications may be made therein without departing from the spirit or scope of this invention.

What is claimed is:

1. A cast compounded polyvinyl chloride film having a thickness of about 0.5 to about 4.5 mils where said polyvinyl chloride has an inherent viscosity in the range of about 1.05 to about 1.15 as determined in cyclohexanone according to ASTM D-1243-66 said film characterized when having a thickness of about 0.8 mils, by an Elmendort tear resistance in the range of about 100 to about 650 grams/mil according to ASTM No. D-1922-61T, a coefficient of friction (film against metal) of about 0.2 to about 2.0 according to ASTM No. D-1894-63, a water vapor transmission rate of 37.8° C. and a humidity of about 90 percent in the range of about 15 to about 50g/100 in$^2$/24 hrs according to ASTM No. E-96-66, Procedure E, and an oxygen transmission of about 350 to about 1200cc/100 in$^2$/1 atm according to ASTM No. D-1434-63, said film comprised of 100 parts by weight of polyvinyl chloride resin, from about 20 to about 45 parts by weight of at least one plasticizer selected from at least one of di(2-ethylhexyl)adipate, epoxidized soyabean oil, epoxidized linseed oil, acetyltributylcitrate, butylbenzylphthalate, dibutyl sebacate, butylstearate, acetyl triethyl citrate, p-tert-butylphenyl salicylate, butylphthalyl butyl glycolate, di-(2-ethylhexyl)phthalate, diethyl phthalate, diisobutyl adipate, diisooctyl phthalate, diphenyl-2-ethylhexyl phosphate, ethylphthalyl, ethyl glycolate, glycerol monooleate, monoisopropyl citrate, mono-, di- and tristearyl citrate, triacetin(glycerol triacetate), triethyl citrate, 3-(2-xenoyl)-1,2-epoxy propane, 1,3-butylene glycol adipic acid polyester of about 1700 to about 2200 molecular weight terminated with at least one organic acid selected from myristic, palmitic and stearic acids, dicyclohexyl phthalate, di(2-ethylhexyl)-acelate, di-n-hexyl azelate, dihexyl phthalate, diphenyl phthalate, diphenyl phthalate, epoxidized butyl esters of linseed oil fatty acids, diisononyl adipate and diisononyl phthalate, from about 0.1 to about 2.5 parts by weight of a pigment having an average particle size in the range of about 2 to about 10 microns selected from pigments comprised of about 50 to about 100 parts by weight percent silica (SiO$_2$), and correspondingly none to about 50 weight percent other oxides selected from aluminum, magnesium, calcium, iron, potassium and sodium, from about 0.05 to about 0.25 parts by weight of a heat stabilizer comprising zinc stearate and calcium stearate in a zinc to calcium weight ratio of about 1:1 to about 3.9:1, from about 0.25 to about 1.5 parts by weight of tris-nonylphenyl phosphite chelator, from about 2 to about 9 parts by weight of at least one surfactant selected from: polyoxyethylene (20) sorbitan monooleate, the mono and diglycerides of fat-forming fatty acids, a nonylphenoxy polyoxyethylene ethanol containing 4 to 5 moles of ethoxylate, glycerol monooleate, sorbitan monooleate, polyoxyethylene(9) monooleate, α-alkyl, α-alkenyl and α-alkylaryl-omega-hydroxypoly(oxyethylene) comprised of at least one of α-(2,4,6-triisobutylphenyl)-omega-hydroxypoly(oxyethylene), α-(Z)-9-octadecenyl-omega-hydroxypoly-(oxyethylene), and α-alkyl (C$_{16}$-C$_{18}$)-omega-hydroxypoly(oxyethylene), α-alkylomega-hydroxy poly(oxyethylene) derived from ethylene oxide and $C_{11}$-$C_{15}$ straight chain secondary alcohols, n-alkyl-sulfonate where said alkyl group has 10–18 carbon atoms, α-di-sec-butylphenyl-omega-hydroxypoly(oxyethylene) derived from ethylene oxide and di-sec-butylphenol, α-dodecyl-omega-hydroxypoly(oxyethylene) mixture of dihydrogen phosphate and monohydrogen phosphate esters derived by esterification of the product of ethylene oxide and n-dodecyl alcohol, α-(p-dodecylphenyl)-omega-hydroxypoly(oxyethylene) derived from ethylene oxide and dodecylphenol, α-(p-nonylphenyl)-omega-hydroxxypoly(oxyethylene) mixture of dihydrogen phosphate and monohydrogen phosphate esters derived from esterification of α-(p-nonylphenyl)-omega-hydroxypoly(oxyethylene), α-(p-nonyl phenyl)-omega-hydroxypoly(oxyethylene) derived from condensation of nonylphenol and ethylene oxide, α-(p-nonylphenyl)-omega-hydroxypoly(oxyethylene)sulfate, ammonium and sodium salts where said nonyl group is a propylene trimer isomer and said poly (oxyethylene) content averages about 4 moles, poly(oxypropylene) block polymer with poly(oxyethylene) having an average molecular weight of about 11,000 to about 18,000, polyoxyethylene(20)sorbitan monostearate, polyoxyethylene(20)sorbitan tristearate, polyoxyethylene(20)sorbitan monooleate, polyoxyethylene(20)sorbitan trioleate, sodium n-alkylbenzenesulfonate where said alkyl group contains an average of about 10 to about 16 carbon atoms, sorbitan monopalmitate, sorbitan monostearate, sorbitan trioleate, sorbitan tristearate, α-[p-(1,1,3,3-tetramethylbutyl)phenyl]-omega-hydroxypoly(oxyethylene) derived from ethylene oxide and p-(1,1,3,3-tetramethylbutyl)phenol, tetrasodium N-(1,2-dicarboxyethyl)-N-octadecyl-sulfosuccinamate, and α-tridecyl-omega-dicarboxyethyl)-N-octadecyl-sulfosuccinamate, and α-tridecyl-omega-hydroxypoly(oxyethylene) mixture of dihydrogen phosphate and monohydrogen phosphate esters derived from esterification of the product of ethylene oxide and tridecyl alcohol, and from about 0.1 to about 1 part by weight of a slip-antiblock agent selected from at least one of the group consisting of ethylene-N,N'-bis-oleamide, hydrofol glyceride, hydrogenated fish oil, calcium ricinoleate and fatty acids amides selected from amides with aliphatic hydrocarbon chains containing in the range of about 16 to 40 even numbered carbon atoms, said hydrocarbon chains being saturated or partly unsaturated said film prepared by the method which comprises (I) sequentially mixing with about 450 to about 600 parts by weight of an organic solvent (A) about 3 to about 40 parts by weight of a pigment masterbatch prepared by high shear mixing at a temperature in the range of about 135° C. to about 190° C, 100 parts by weight of polyvinyl chloride resin with from about 10 to about 60 parts by weight of said plasticizer, from about 2 to about 6 parts by weight of said pigment, from about 1 to about 5 parts by weight of said stabilizer and from about 0.5 to about 3.0 parts by weight of said chelator, (B) 100 parts by weight of polyvinyl chloride resin and (C) about 2 to about 9 parts by weight of said surfactant, about 0.1 to about 1.0 parts by weight of the slip agent, about 0.1 to about 1.4 parts by weight of said chelator and about 18 to about 43 parts by weight of said plasticizer, (II) casting said mixture as a film, and (III) drying the cast film at a temperature in the range of about 25° C. to about 95° C.

2. The compounded polyvinyl chloride of claim 1 as a packaging film having a thickness in the range of about 0.5 mils to about 4.5 mils where said polyvinyl chloride has an inherent viscosity in the range of about 1.05 to about 1.15 as determined in cyclohexanone according to ASTM No. D-1243-66, said plasticizer is selected from at least one of di(2-ethylhexyl)adipate, di(2-ethylhexyl)azelate, di-n-hexyl azelate and epoxidized soyabean oil containing about 7 to about 9.5 weight percent oxirane oxygen, where said silica pigment comprises about 95 to about 100 weight percent silica with the remainder being primarily aluminum oxide, where said surfactant is selected from a mixture of polyoxyethylene (20)sorbitan monooleate, said nonylphenoxy polyoxyethylene ethanol and mono and diglycerides of fat-forming fatty acids, and where said slip-antiblock agent is ethylene-N,N-40 -bis-oleamide.

3. The film according to claim 2 where said solvent is selected from tetrahydrofuran, methyl ethyl ketone, methyl isobutyl ketone, cyclohexanone, dioxane and dimethyl formamide, where the plasticizer is selected from di(2-ethylhexyl) adipate, di(2-ethylhexyl) azelate, di-n-hexyl azelate and epoxidized soyabean oil, the pigment is at least 95 weight percent silica, the surfactant is a mixture of polyoxyethylene(20)sorbitan monooleate, nonylphenoxy polyethylene ethanol and mono and diglycerides of fat-forming fatty acids and said slip-agent is ethylene-N,N'-bis-oleamide.

4. A compounded polyvinyl chloride characterized, when having a thickness of about 0.8 mils, by an Elmendorf tear resistance in the range of about 100 to about 650 grams/mil according to ASTM No. D-1922-61T, a coefficient of friction (film agains metal) of about 0.2 to about 2.0 according to ASTM No. D-1894-63, a water vapor transmission rate at 37.8° C and a humidity of about 90 percent in the range of about 15 to about 50g/100 in $^2$/24 hours according to ASTM No. E-96-66, Procedure E, and an oxygen transmission of about 350 to about 1200cc/100 in$^2$/24 hrs/1 atm according to ASTM No. D-1434-63, which comprises 100 parts by weight of a polyvinyl chloride resin, from about 20 to about 45 parts by weight of at least one plasticizer selected from di(2-ethylhexyl)adipate, epoxidized soyabean oil, epoxidized linseed oil, acetyltributylcitrate, butylbenzylphthalate, dibutyl sebacate and butylstearate, from about 0.1 to about 2.5 parts by weight of a pigment having a particle size in the range of about 2 to about 10 microns selected from pigments comprised of about 50 to about 100 weight percent silica and correspondingly about 0 to about 50 weight percent other oxides selected from aluminum, magnesium, calcium, iron, potassium and sodium, from about 0.05 to about 0.25 part by weight of a heat stabilizer comprisng zinc stearate and calcium stearate in a zinc to calcium weight ratio of about 1:1 to about 3.9:1, from about 0.25 to about 1.5 parts by weight of tris-nonylphenyl phosphite as a chelator, from about 2 to about 9 parts by weight of at least one surfactant selected from polyoxyethylene (20)sorbitan monooleate, the mono and diglycerides of fat-forming fatty acids, a nonylphenoxy polyoxyethylene ethanol containing 4 to 5 moles of ethoxylate, glycerol monooleate, sorbitan monooleate and polyoxyethylene(9) monooleate, and from about 0.1 to about 1 parts by weight of a slip-antiblock agent selected from at least one of the group consisting of ethylene-N,N'-bis-oleamide, hydrofol glyceride, hydrogenated fish oil, calcium ricinoleate and fatty acid amides selected from amides with aliphatic hydrocarbon chains containing in the range of about 16 to 40 even numbered carbon atoms, said hydrocarbon chains being saturated or partly unsaturated with 1 to 2 carbon-to-carbon double bonds of unsaturation.

5. The compounded polyvinyl chloride according to claim 4 where the silica pigment comprises about 95 to about 100 weight percent silica with the remainder being primarily aluminum oxide, where said surfactant is selected from a mixture of polyoxyethylene(20)sorbitan monooleate, said nonylphenoxy polyoxyethylene ethanol and mono and diglycerides of fat-forming fatty acids.

6. The compounded polyvinyl chloride of claim 5 where said polyvinyl chloride has an inherent viscosity in the range of about 1.05 to about 1.15 as determined in cyclohexanone according to ASTM No. D-1243-66, said plasticizer is selected from at least one of di(2-ethylhexyl)adipate and epoxidized soyabean oil containing about 7 to about 9.5 weight percent oxirane oxygen, said silica pigment has a silica content of at least 98 weight percent and where said slip-antiblock agent is ethylene-N,N'-bis-oleamide.

7. The compounded polyvinyl chloride of claim 4 as a packaging film having a thickness in the range of about 0.5 mils to about 4.5 mils.

8. A method of preparing the compounded polyvinyl chloride of claim 4 which comprises (I) sequentially mixing with about 450 to about 600 parts by weight of an organic solvent (A) about 3 to about 40 parts by weight of a pigment masterbatch prepared by high shear mixing at a temperature in the range of about 135° C to about 190° C 100 parts by weight of polyvinyl chloride resin with from about 10 to about 60 parts by weight of said plasticizer, from about 2 to about 6 parts by weight of said pigment, from about 1 to about 5 parts by weight of said stabilizer, and from about 0.5 to about 3.0 parts by weight of said chelator, (B) 100 parts by weight of polyvinyl chloride resin and (C) about 2 to about 9 parts by weight of the surfactant, about 0.1 to about 1.0 parts by weight of said slip agent, about 0.1 to about 1.4 parts by weight of said chelator and about 18 to about 43 parts by weight of said plasticizer and (II) drying the prepared mixture.

9. The method according to claim 8 where said solvent is selected from tetrahydrofuran, methyl ethyl ketone, methyl isobutyl ketone, cyclohexanone, dioxane and dimethyl formamide.

10. The method according to claim 9 where the solvent is tetrahydrofuran, the plasticizer is selected from di(2-ethylhexyl)adipate and epoxidized soyabean oil, the pigment is at least 95 weight percent silica, the surfactant is a mixture of polyoxyethylene(20)sorbitan monooleate, nonylphenoxy polyethylene ethanol and mono and diglycerides of fat-forming fatty acids and said slip-agent is ethylene-N,N'-bis-oleamide.

11. The method according to claim 8 where the prepared mixture is cast and dried to form a film suitable for packaging having a thickness in the range of about 0.5 to about 4.5 mils.

* * * * *